(12) United States Patent
Sim

(10) Patent No.: US 6,935,797 B2
(45) Date of Patent: Aug. 30, 2005

(54) KEYBOARD WITH BUILT-IN MICROPHONE

(75) Inventor: Wong Hoo Sim, Singapore (SG)

(73) Assignee: Creative Technology Limited, Singapore (SG)

( * ) Notice: Subject to any disclaimer, the term of this patent is extended or adjusted under 35 U.S.C. 154(b) by 0 days.

(21) Appl. No.: 10/640,210

(22) Filed: Aug. 12, 2003

(65) Prior Publication Data

US 2005/0036814 A1 Feb. 17, 2005

(51) Int. Cl.$^7$ .................................................. B41J 5/08
(52) U.S. Cl. ...................... 400/472; 400/477; 400/479; 400/480; 345/168
(58) Field of Search ................................. 400/472–474, 400/479–481, 477, 100, 663–666, 414; 341/21, 22, 168; 361/679, 680; 345/168–172; 235/5 A, 145 A, 145 R, 146; 434/227–233

(56) References Cited

U.S. PATENT DOCUMENTS

| | | | |
|---|---|---|---|
| 5,865,546 A | | 2/1999 | Ganthier et al. |
| 5,896,125 A | | 4/1999 | Niedzwiecki |
| 6,056,193 A | * | 5/2000 | McAuliffe et al. .......... 235/380 |
| 6,317,061 B1 | | 11/2001 | Batra et al. |
| 6,375,082 B1 | * | 4/2002 | Kobayashi et al. ......... 235/492 |
| 6,587,053 B1 | * | 7/2003 | Lee ....................... 340/825.72 |
| 6,633,155 B1 | * | 10/2003 | Liang ......................... 320/166 |
| 6,659,665 B1 | * | 12/2003 | Huang et al. ................ 400/472 |
| 2002/0109675 A1 | * | 8/2002 | Kuan ........................... 345/168 |
| 2003/0103039 A1 | | 6/2003 | Burr et al. |
| 2003/0174123 A1 | * | 9/2003 | Cheng .......................... 345/163 |
| 2003/0197681 A1 | * | 10/2003 | Liang .......................... 345/163 |

FOREIGN PATENT DOCUMENTS

| | | |
|---|---|---|
| EP | 0 863 477 A1 | 9/1998 |
| GB | 2 288 368 A | 10/1995 |
| GB | 2 314 470 A | 12/1997 |
| GB | 2 367 266 A | 4/2002 |
| GB | 2 389 430 A | 12/2003 |
| WO | WO 96/06486 | 2/1996 |
| WO | WO 01/18662 A1 | 3/2001 |

* cited by examiner

Primary Examiner—Minh Chau
(74) Attorney, Agent, or Firm—Blakely, Sokoloff, Taylor & Zafman; Stephen M. De Klerk

(57) ABSTRACT

An alphanumeric keyboard has a plurality of alphanumeric keys and includes at least one built-in microphone. The at least one microphone is controlled by a processor such that the at least one microphone is able to be operated in an automatic mode. When in the automatic mode and an alphanumeric key is activated, the at least one microphone is deactivated for a predetermined period. The predetermined period is controlled by a timer. Also disclosed is the inclusion in the keyboard of one or more of: echo cancellation; a card reader; a wireless data receiver; and a contactless induction charger.

38 Claims, 16 Drawing Sheets

KEYBOARD WITH BUILT-IN MICROPHONE

FIELD OF THE INVENTION

The present invention relates to a keyboard with at least one in-built microphone with an automatic function and preferably, but not exclusively, to such an alphanumeric keyboard that also has peripheral functionality.

DEFINITIONS

Throughout this specification reference to "alphanumeric" is to be taken as including any symbols that may be found on the keys of a computer keyboard including regional or national alphabets, scripts and symbols. For example, a so-called "western" keyboard may include the following alphanumeric keys:

alpha keys a to z;

numeric keys 0 to 9;

function keys including dedicated function keys such as, for example, F1 to F12, and such keys as Internet access keys;

instructional keys such as, for example, "Esc", "Enter", "Ctl", "Shift", "Tab", "Caps Lock", "Delete", "Ins", "Home", "Page Up", "Page Down", "End", "Num Lock";

cursor control keys;

and the "Shift" function of all of them.

BACKGROUND TO THE INVENTION

Many alphanumeric keyboards for computers now have a digital data connection to the host computer. The digital data connection may be a USB connection or IEEE 1394, or other relevant system including wireless connections. In many instances this is to allow extra function keys on the keyboard to control audio functions of the host. The audio functions may be, for example, volume controls, play functions, and so forth. By use of the digital data connector these may be controlled from the keyboard.

Peripheral devices such as a mouse are often connected to the host by a wireless connection using a wireless hub, the wireless hub being connected to the host using a wired digital data connector. This means that if only the mouse is wireless, there is more hardware, and still the same number of cables connected to the host. The wireless hub will also require a power supply, thus adding more cables.

SUMMARY OF THE INVENTION

In accordance one aspect of the present invention there is provided an alphanumeric keyboard having a digital data connector for connection with a host computer, the alphanumeric keyboard having at least one in-built functional components for cooperating with at least one external component to enable data received from the at least one external component to be communicated to the host computer using the digital data connector; and the in-built functional component is able to have power supplied to it from the host computer using the digital data connector, the external component being external to both the host and the alphanumeric keyboard.

In accordance with a second aspect of the invention there is provided an alphanumeric keyboard having a digital data connector for connection with a host computer, the alphanumeric keyboard having built-in a wireless data receiver for receiving wireless communication from a peripheral device. The wireless data receiver is able to communicate with the host computer using the digital data connector, and is able to have power supplied to it from the host computer using the digital data connector. The second aspect may be in addition to the first aspect, or as an alternative to the first aspect.

In accordance with another aspect there may be provided an alphanumeric keyboard having a digital data connector for connection with a host computer, the alphanumeric keyboard having built-in a card reader. The card reader is able to communicate with the host computer using the digital data connector, and is able to have power supplied to it from the host computer using the digital data connector. This may be in addition to or as an alternative to the aspects described above.

The card reader may be either or both of a radio frequency card reader, and a reader of non-volatile memory devices for data transfer, data storage, multimedia file playback, multimedia data transfer, and multimedia data storage, and so forth. Memory devices may include Flash cards, Secure Digital memory cards, Multi-Media Cards, Compact Flash cards, Memory Sticks from Sony Corp, Microdrives from IBM Corp, and SmartMedia memory cards. The card reader may be additional to or as an alternative to the wireless data receiver.

For all aspects, the digital data connector may be a USB connector or an IEEE 1394 connector. The peripheral device may be a wireless mouse.

According to a further aspect there is provided an alphanumeric keyboard having a plurality of alphanumeric keys and including at least one built-in microphone. The at least one microphone is able to be operated in an automatic modes. In the automatic mode upon one of the alphanumeric keys being activated, the at least one microphone is deactivated for a predetermined period. The predetermined period is controllable by a timer. The further aspect may be additional to or as an alternative to one or more of the aspects described above.

The microphones may detect the key press and mute an audio component. Additionally or alternatively, the processor may be able to detect a scan code generated by a keyboard driver of the alphanumeric keyboard and to mute the audio line from the microphones to disable the at least one microphone for the predetermined period in response to the receipt of the scan code. The predetermined period may be in the range 10 milliseconds to 10 seconds. At the end of the predetermined period the processor may reactivate the at least one microphone by cancelling the mute function.

Upon the microphones detecting a further key stroke sound and/or the keyboard driver generating a further scan code as a result of a further activation of at least one of the alphanumeric keys, the timer may reset the predetermined period.

The audio component may be one of: an audio line, a digital amplifier, an analog audio component, and a digital audio component. There may also be a buffer to delay processing of signals to prevent key press sounds from being processed as desired audio inputs. Upon a key press sound being detected, the buffer may be purged and muting take place.

The alphanumeric keyboard may further include one or more of: noise cancellation; a radio frequency card reader as described above; echo cancellation; and a wireless data receiver as described above. There may be a plurality of microphones in a spaced-apart relationship in the alphanumeric keyboard.

The keyboard may further include a switch to control the operation of the at least one microphone. The switch is preferably a physical switch and may have an LED display to indicate an operational mode of the switch.

There may be provided a keyboard driver for generating a scan code resulting from the activation of the at least one of the alphanumeric keys, the scan code being able to be detected by the processor to enable the processor to mute an audio line from the at least one microphone and, at the end of the predetermined period, the processor enables the at least one microphone by cancelling the muting of the audio line. Upon the processor detecting a further scan code resulting from a further activation of at least one of the alphanumeric keys within the predetermined period, the timer resets the predetermined period.

In a final preferred aspect there is provided an alphanumeric keyboard having a digital data connector for supplying received DC power to the keyboard, the keyboard comprising an inverter for transforming the received DC power to a primary AC power of a primary frequency; and a primary coil immediately adjacent a wall of the keyboard and being adapted to have applied to it the primary AC power. The primary coil is able to induce an eddy current in a secondary coil located within a wireless mouse when the secondary coil is brought into close proximity to the primary coil. This generates a secondary voltage across the secondary coil to enable recharging of at least one battery in the wireless mouse by contactless induction charging. The final aspect may be additional to or as an alternative to one or more of the aspects described above.

The primary coil and secondary coils may each have a hollow core, and the primary coil may have a ferrite rod in its hollow core. The primary coil may be perpendicular to the wall, the ferrite rod projecting through the wall for surface interlock charging; or may be parallel to the wall for surface close coupled charging.

The primary AC power may be of a frequency above the audible range such as, for example, the range of from 20 KHz to 25 KHz.

There may also be provided a secondary rectifier between the secondary coil and the at least one battery for rectifying the secondary voltage and charging the battery.

The alphanumeric keyboard may have a recess in a side wall thereof sized and shaped to receive a front portion of the mouse. The recess may have a wall. The primary coil may be adjacent the wall. The secondary coil may be in the front portion of the mouse. The recess may have a shelf on which the mouse can rest.

The wall of the alphanumeric keyboard may be a side wall, the mouse having a mouse wall, the mouse wall being able to contact the side wall; the secondary coil being adjacent the mouse wall.

Alternatively, the wall may be a top surface of the alphanumeric keyboard, there being provided a docking station in the top surface; the primary coil being located under the docking station; the secondary coil being located above a base of the mouse.

DESCRIPTION OF THE DRAWINGS

In order that the invention may be fully understood and readily put into practical effect there shall now be described by way of non-limitative example only preferred embodiments of the invention, the description being with reference to the accompanying illustrative drawings in which.

DESCRIPTION OF THE PREFERRED EMBODIMENT

Figure 1:
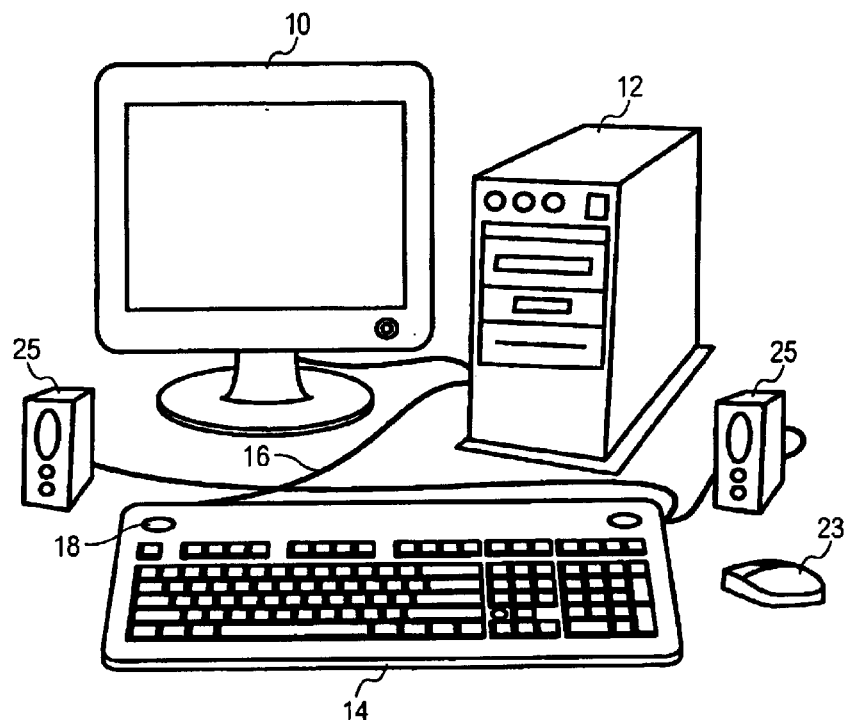
FIG. 1 is an illustration of a computer system incorporating a keyboard according to a first aspect of the present invention.
Figure 2:
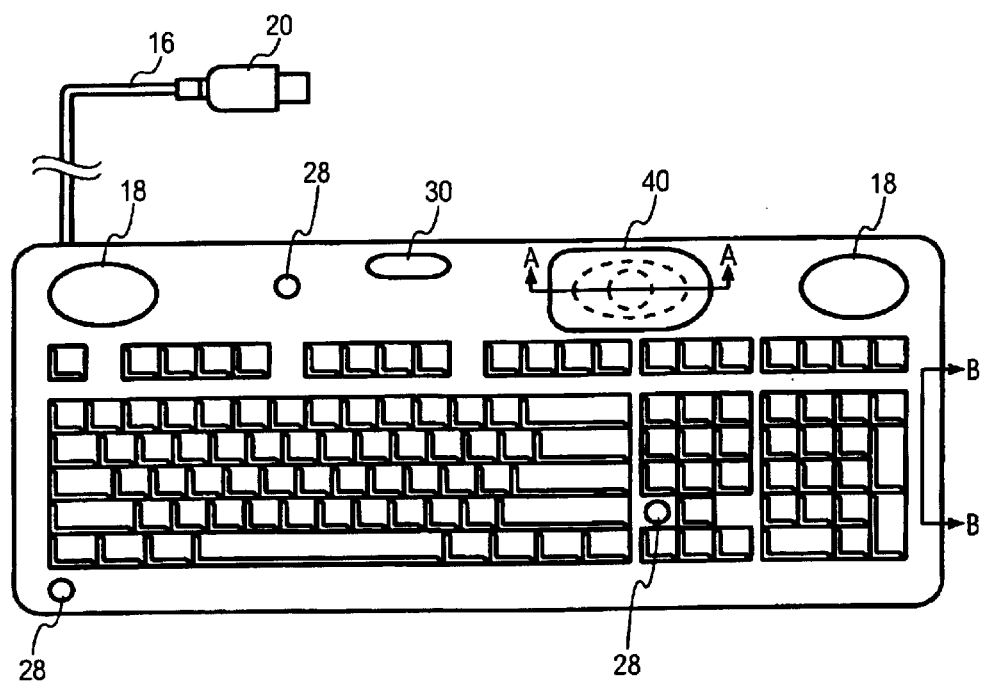
FIG. 2 is a top view of the keyboard of FIG. 1.
Figure 3:
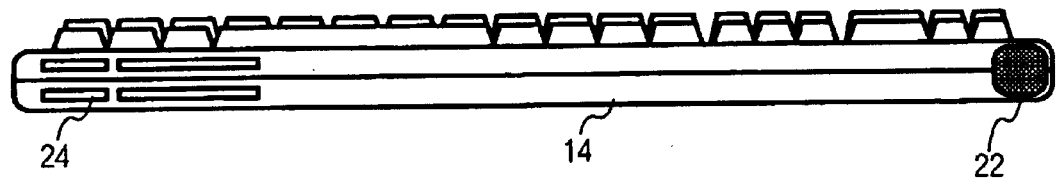
FIG. 3 is a front view of the keyboard of FIGS. 1 and 2.
Figure 4:
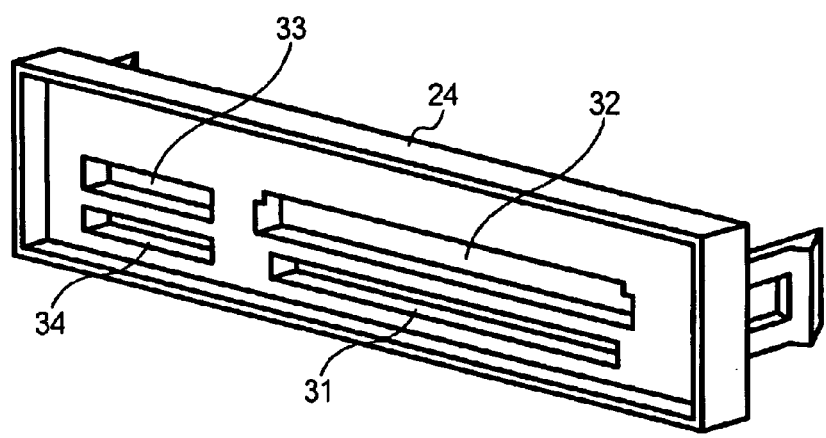
FIG. 4 is an illustration of the fascia of the card reader of FIG. 3.

To first refer to FIGS. 1, 2 and 3, there is shown a computer system including monitor 10, host PC 12 and keyboard 14. Keyboard 14 is shown connected to host PC 12 by a cable 16. Alternatively, a wireless connection may be used. The wireless connection may be by any suitable system including, for example, Bluetooth, or any other radio frequency or infrared system.

Keyboard 14 may have built-in speakers 18. Cable 16 is connected to keyboard 14 at one end, and has its other end at least one digital data connector 20. It is preferred for there to be only one connector 20. The connector 20 may be a USB connector or a IEEE 1394 connector, or other suitable digital data transfer connector. In the following description reference will be made to the use of a single USB connector for the sake of convenience.

As is shown in FIG. 2, the keyboard 14 has a number of built-in functional components including built-in wireless receiver 22 for a peripheral device to be able to communicate with the host 12. The peripheral device may be a wireless mouse 23. In this way a separate wireless hub connected to the host 12 is not required and the keyboard 14 acts as the wireless hub. This also clears a cable from the computer system and thus assists in clearing a desk of a user. Receiver 22 may be a transmitter/receiver, if desired or required.

Alternatively or additionally, the keyboard 14 may have a built-in card reader 24. The card reader 24 fascia may be as illustrated in FIG. 3 and be to enable non-volatile memory to be used in conjunction with host 12 for data transfer and storage, multimedia file playback, multimedia data transfer and storage, and so forth. Memory devices may include, but are not limited to, for example, secure digital memory sticks, multi-media cards, compact Flash cards, memory sticks, MicroDrives as available from IBM, and SmartMedia memory cards. Card reader 24 may have a plurality of slots to receive different forms of memory devices. For example, slot 31 may be for SmartMedia memory cards, slot 32 may be for compact Flash cards or MicroDevices, slot 33 for Memory Stick and slot 34 for Secure Digital memory cards and Multi-Media Cards.

Alternatively or additionally, card reader 24 may be or include a radio frequency card reader and thus any card only needs to be placed in close proximity to card reader 24 for data transfer to take place. This would be relevant for radio frequency cards including, but not limited to, smart cards such as, for example, cash cards, membership cars, identity cards, and security passes, to be used in conjunction with host 12 for on-line payments, security access, security clearance, password confirmation, identity confirmation, and so forth.

Power for card reader 24 and wireless receiver 22 may be obtained from the power connection available through the digital data connector 20. Data transfer between card reader 24 and host 12, and between receiver 22 and host 12, will also able to be through the digital data connector 20. In this way card reader 24 and wireless receiver 22 do not need an external power source. In this way the keyboard 14 may be used for many of the basic functions for host computer 12 and thus enables keyboard 14 to be more versatile. It may also reduce cable clutter.

A docking station 40 for the wireless mouse 23 may also be provided. This may be in a top wall of the keyboard 14.

Figure 5:
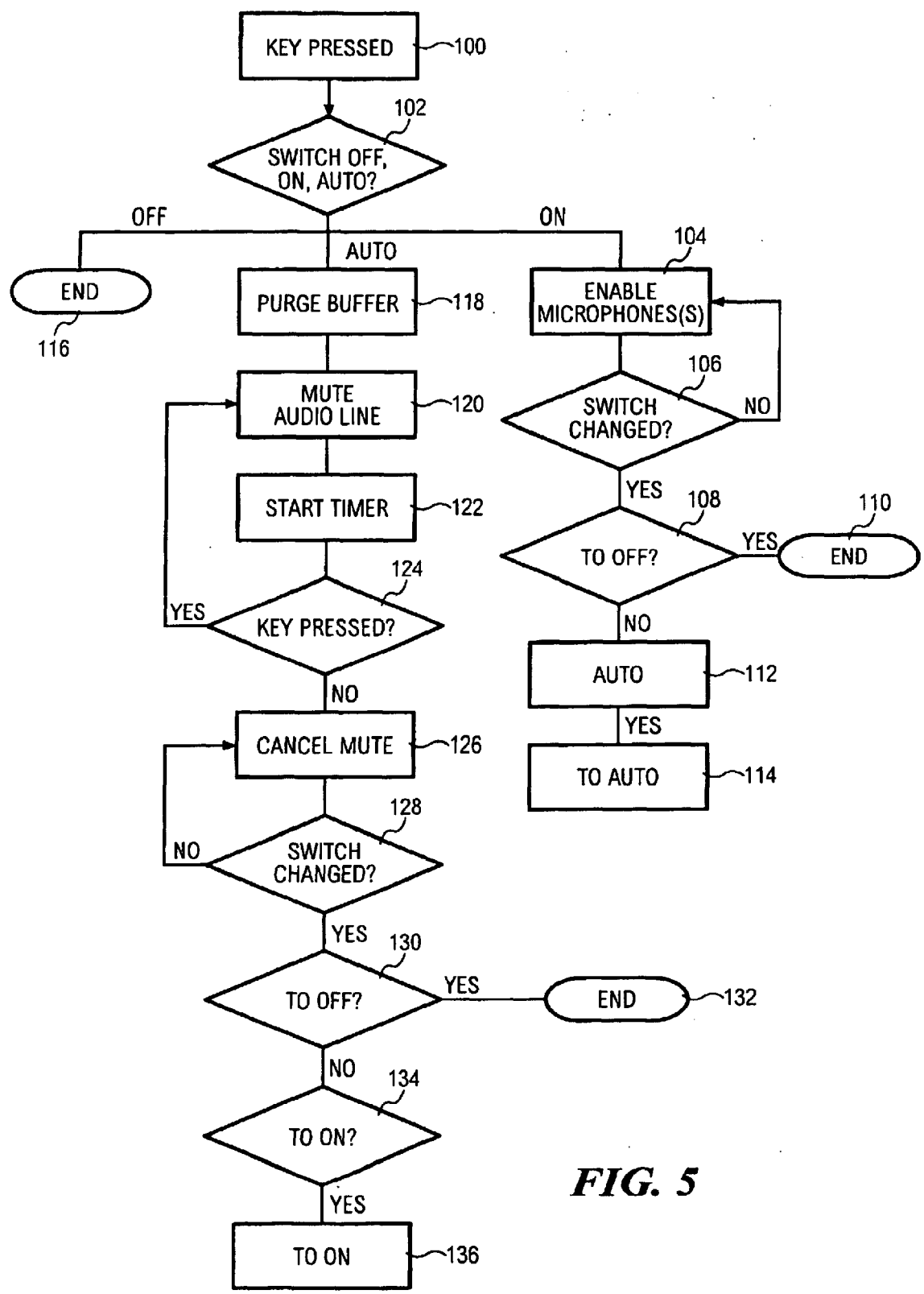
FIG. 5 is a flow chart for the operation of the microphones.
Figure 6:
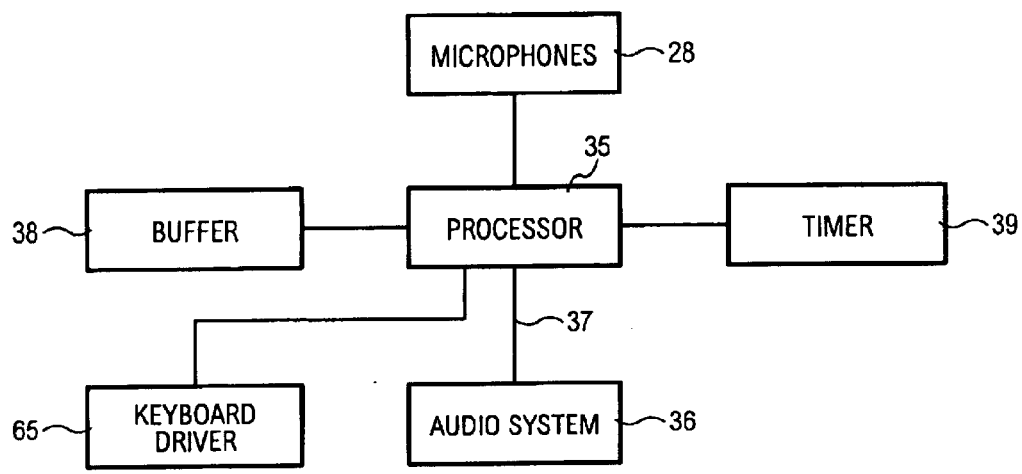
FIG. 6 is an architecture diagram.
Figure 7:
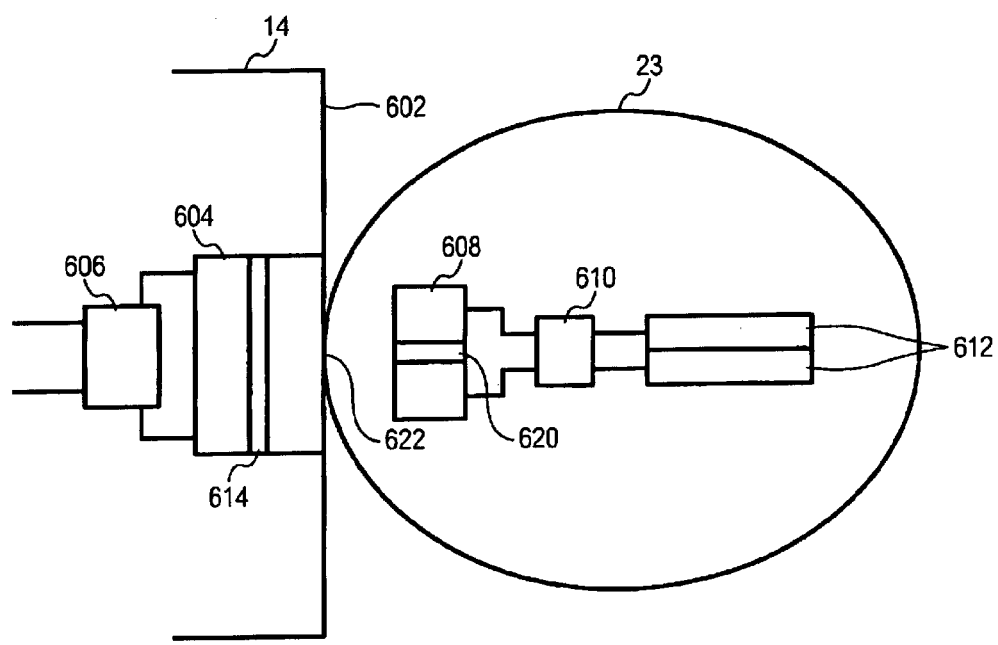
FIG. 7 is a partial sectional view of a further embodiment, the section along the lines and in the direction of arrows B—B on FIG. 2.
Figure 8:
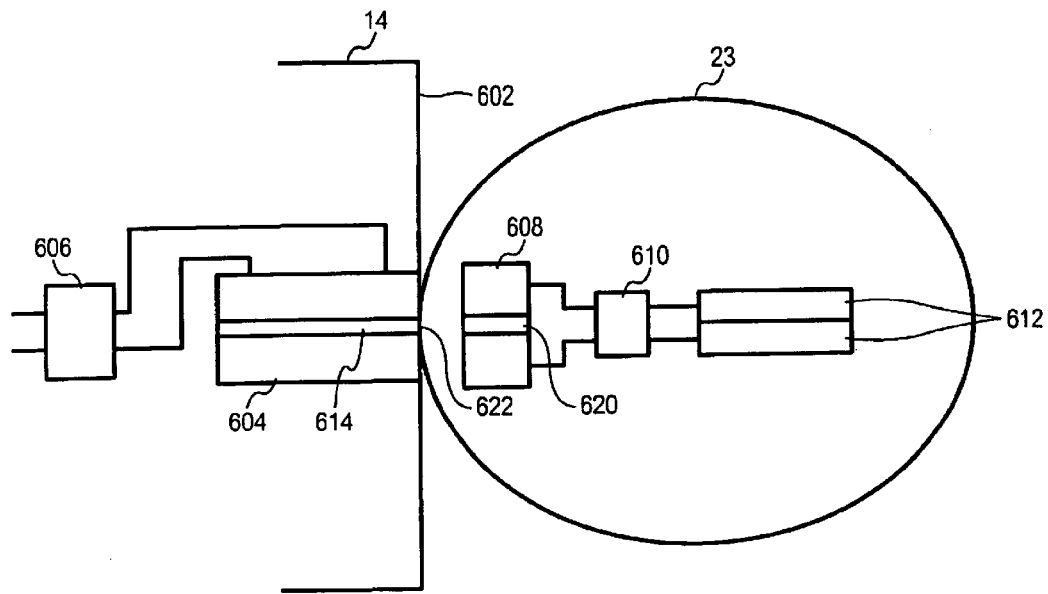
FIG. 8 is a view corresponding to FIG. 6 of a second form of the further embodiment.
Figure 9:
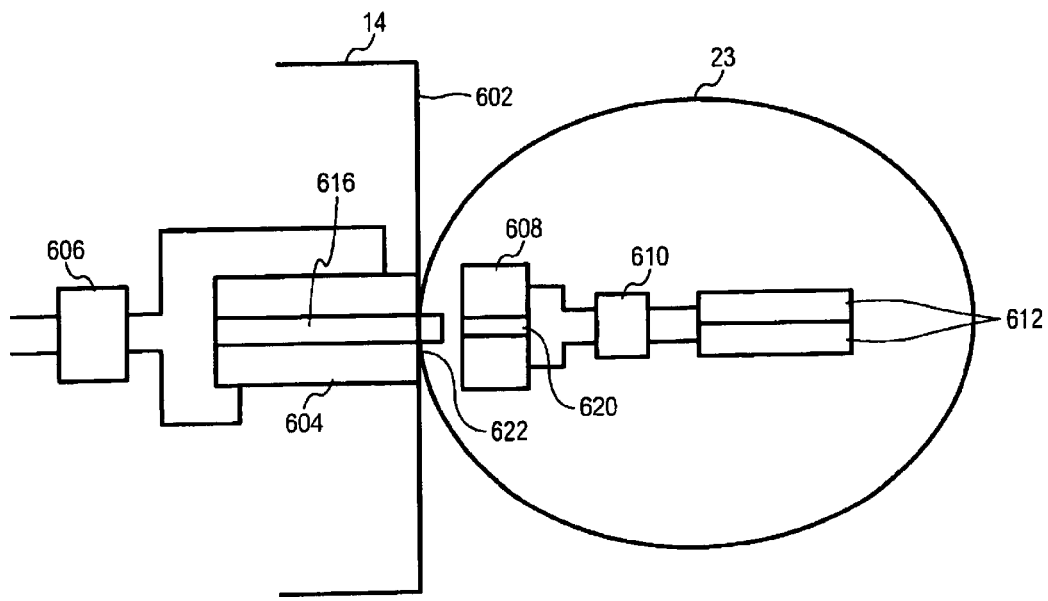
FIG. 9 is a view corresponding to FIG. 6 of a third form of the further embodiment.

As can be seen, the keyboard 14 may also have one or more built-in microphones 28, the operation of which is illustrated in FIGS. 5 and 6. Preferably, the microphones 28 are in a top wall of the keyboard 14. However, one or more of them may be in a side wall of the keyboard 14.

A switch 30 is provided to control the operation of microphones 28. Switch 30 is preferably a physical switch because if a software switch was used it may be able to be remotely accessed and the microphones 28 activated. This may allow a remote person to record conversations in the room in which keyboard 14 is located. This may be a breach of security or a breach of privacy. The switch 30 may have a LED display to indicate the operational mode of switch 30. Preferably, the switch 30 is in a top wall of the keyboard 14, but it may be in a side wall, if desired or required.

When an alphanumeric key is pressed (100), the position of switch 30 is checked (102). The switch 30 preferably has three positions—ON, OFF and AUTO. OFF disables all microphones 28 (102). ON enables on all microphones 28 (104) and they remain enabled until the switch 30 is changed (106). If the switched 30 is moved to OFF (108), the activation of the microphones 28 ends (116). If the switch 30 is moved to auto (112) the microphones move to the auto mode (114). However, if desired or required, the switch 30 may have only two positions. These may be OFF and an ON position that corresponds directly to the AUTO position described above and below.

As shown in FIG. 6, there is a processor 35 that controls the operation of microphones 28 in response to switch 30 and input from microphones 28. The processor 36 may be in the host 12 or, alternatively, may be in the keyboard 14. The processor 38 passes audio signals from microphones 28 to an audio system 36 along at least one audio line 37. The processor 35 has timer 39 that may be integral with processor 35 or may be separate. There may also be a buffer 38 that may be integral with processor 35 or separate. Preferably, buffer 38 is in keyboard 14 even if processor 35 is in host 12.

The output of microphones 28 will be analog audio. To be able to be processed in a digital environment, the analog audio needs to be:

(i) converted to digital audio using an analog-to-digital converter in keyboard 14 and then sent over the digital data connection to a sound card in host 12. It can then be sent back to the keyboard 14 over the digital data connection; or (ii) processed in a separate processor(s) in keyboard 14 to enable it to be converted to digital audio and processed within the keyboard 14. This may be in accordance with the system disclosed in my co-pending U.S. patent application entitled "Keyboard With Digital Audio" as filed on May 23, 2003, the contents of which are hereby Incorporated by reference.

In FIG. 5, when switch 30 is in AUTO, the microphones 28 are enabled (118) until a key of the keyboard 14 is pressed (100). As soon as a key is pressed, the keyboard driver 65 generates a scan code resulting from the key press, and processor 35 detects the scan code. The processor 35 purges buffer 38 and mutes audio line 37 (120) or, alternatively, switches off audio line 37. The buffer 38 enables the processing of signals from the microphones 28 to be delayed to prevent key press sounds from being processed as desired audio inputs. Timer 39 is started (122) and, after a prescribed delay (124), the microphones are enabled by cancelling the mute function on lines 37 (126) unless there has been a further pressing of a key of keyboard 12, in which case the timer 39 (122) is reset to zero, and recommended. This continues until there is no key pressed in the prescribed delay, whereupon the microphones 28 are enabled (126) by cancelling the mute function.

Additionally or alternatively, as soon as a key is pressed, the microphones 28 may be used to detect the noise of the key press and the signal passed to the processor 36. The process proceeds as described above.

The prescribed delay may be preset, or be set by user input. It should be of a relevant duration such as 1, 2, 3, 4, 5 or 10 seconds. The buffer 38 introduces a time delay of less than second, preferably of the order of 50 to 500 milliseconds.

If at any time the switch 30 is moved to a different position this is detected at 128. If yes, and the switch is in the OFF position (130) the inputs of the microphones into the audio system are disabled (132). If it is moved to the ON position (134) the system reverts to ON mode (136, 104).

The ON mode is more suitable for continuous use of microphones 28. This may, for example, be when using voice-to-text word processing, Internet telephony such as VoIP, or voice recording. The AUTO mode would be more suitable for functions where there is both audio input and keyboard functions. In this way the microphones 28 do not detect the use of the alphanumeric keys of keyboard 14 and thus the audio system 36 does not record, playback, transmit or otherwise propagate the sounds of the keys.

By having more than one microphone 28, it is possible to use an echo-cancelling feature such as, for example, the "Adaptive Echo Canceller" available from Infinior MicroSystems Co Ltd of Seoul, Korea; or "Acoustic Echo Canceller" available from NEC Electronics Corporation of Japan. Both of these systems are for a single microphone and speaker and thus it may be necessary to have a separate system for each microphone/speaker pair.

To now consider FIGS. 7 to 11, there is shown part of the keyboard 14 including apparatus for recharging batteries of the wireless mouse 23 by contactless induction charging.

The keyboard 14 has a wall 602. This may be a front wall, side wall or rear wall. Located immediately adjacent the wall 602 is a primary coil 604. Primary coil 604 receives power from digital data connector 20. If digital data connector 20 is a USB connector, the power will be at 5V DC. This is inverted to AC using DC-AC inverter 606 and the AC power is applied to the primary coil 604.

When wireless mouse 23 is brought into close proximity to primary coil 604, a secondary coil 608 in mouse 23 moves to be within the magnetic field generated by primary coil 604. Eddy currents will therefore be induced within secondary coil 608. This generates an AC voltage across secondary coil 608. This generated AC voltage is then rectified in an AC-DC rectifier 610 and used to recharge batteries 612 in mouse 23. Rectifier 610 may also have a battery charging circuit (not shown). The battery charging circuit may be a separate component if desired.

Primary coil 604 may have a core 614 that may be hollow, or may have ferrite core 616 if desired or required.

Figure 10:
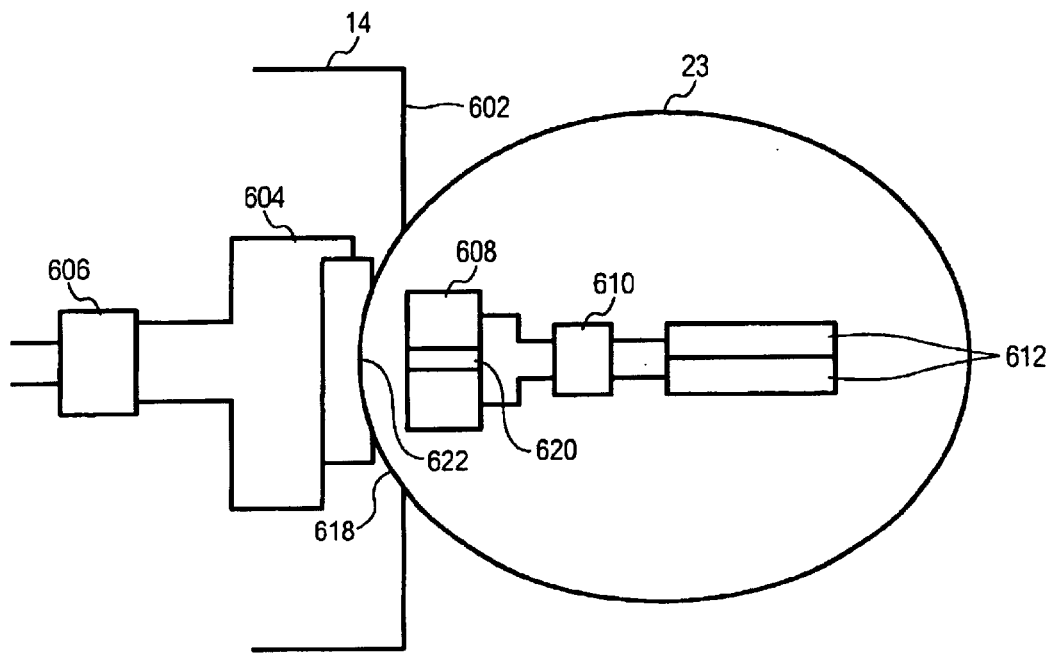
FIG. 10 is a view corresponding to FIG. 6 of a fourth form of the further embodiment.
Figure 11:
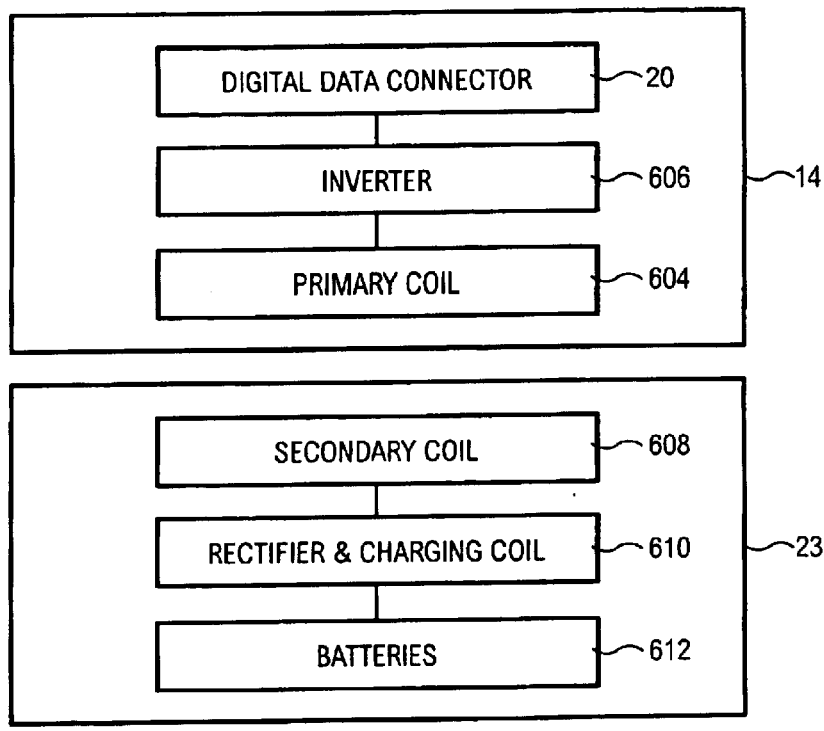
FIG. 11 is a block diagram of the components of the further embodiment.

Primary coil 604 may be arranged parallel to wall 602 for surface close coupled charging (FIG. 7); perpendicular to wall 602 but not projecting through wall 602 for surface close coupled charging (FIG. 8); perpendicular to wall 602 and with ferrite rod 616 projecting through wall 602 for surface interlock charging (FIG. 9); or may be around or immediately adjacent a concave recess 618 in wall 602 shaped to correspond to the shape of mouse 23 in the region of secondary coil 608 for surface close coupled charging (FIG. 10).

Secondary coil 608 preferably has a hollow core 620 with the core 620 being aligned to be perpendicular to wall 622 of mouse 23.

The ratio of the number of windings of primary coil 604 and secondary coil 608, together with the voltage applied to primary coil 604, will determine the maximum possible voltage generated across secondary coil 608. For example, if the voltage across the primary coil 604 is 20V AC, the voltage generated across secondary coil 608 may be of the order of 3.5V AC. This would be rectified to 3.5V DC to provide a slow change for batteries 612. It is preferred for the secondary coil 608 voltage to be in the range 6 to 8 AC. The voltage generated across secondary coil 608 should be that required to recharge the batteries 612.

It is preferred for the AC voltage to be of a high frequency—preferably above the normal hearing range of humans. For example, it may be in the range of 20 to 25 KHz, preferably 22 KHz. This would eliminate the usual, audible, transformer-style hum.

The efficiency of induction of the eddy currents in the secondary coil 608 will vary according to the relative positions of the secondary coil 608 and the primary coil 604. That of FIG. 7 has a relatively low efficiency, whereas that of FIG. 8 has a relatively high efficiency. The efficiency way vary from as low as 5% up to about 20%.

Figure 12:
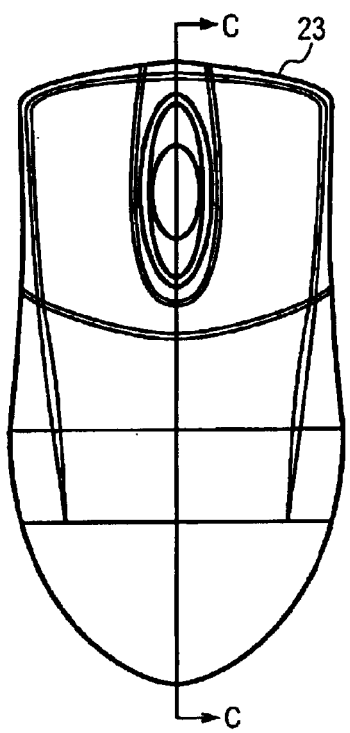
FIG. 12 is a top view of the wireless mouse of FIG. 1.
Figure 13:
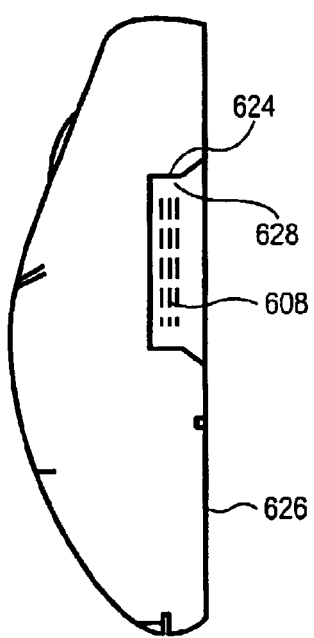
FIG. 13 is one embodiment of a cross-sectional view along the lines and in the direction of arrows C—C on FIG. 12.

FIGS. 12 to 18 show two variations of the embodiment of FIGS. 7 to 11. In FIGS. 12 to 13, the mouse 23 is to be used with the docking station 40. The mouse 23 may have a recess 624 in its base 626, the secondary coil 608 being wound around or be immediately adjacent (but preferably coaxial with) recess 624. The recess 624 may have a tapered entry 628, if desired. The docking station has ferrite rod 616 of primary coil 604 projecting through docking station 40 to engage in recess 624.

Figure 16:
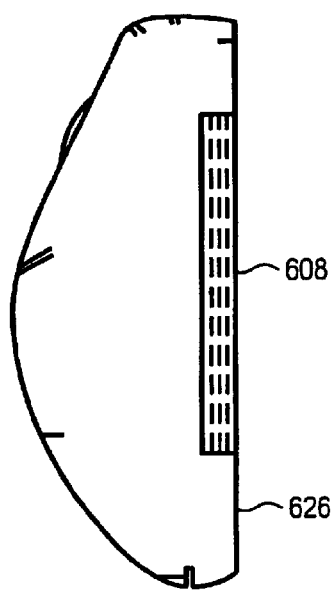
FIG. 16 is a second embodiment of a cross-sectional view along the lines and in the direction of arrows C—C on FIG. 12.
Figure 17:
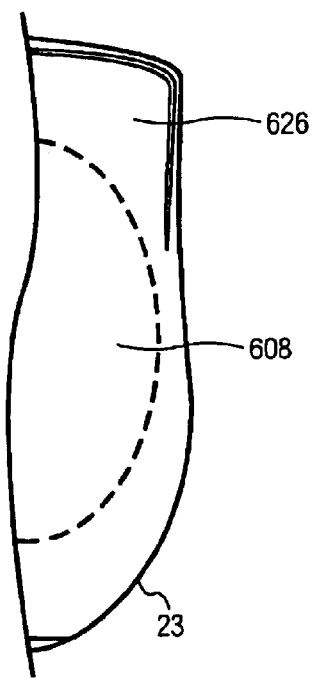
FIG. 17 is a partial underneath view of the embodiment of FIG. 16.
Figure 18:
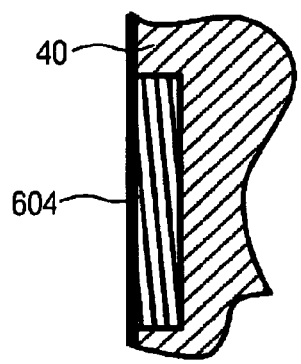
FIG. 18 is a second embodiment of a cross sectional view along the lines and in the direction of arrows A—A on FIG. 2.

For FIGS. 16 to 18, the primary coil 604 is beneath the surface of docking station 40. The secondary coil 608 is therefore on base 626 of mouse 23.

Figure 19:
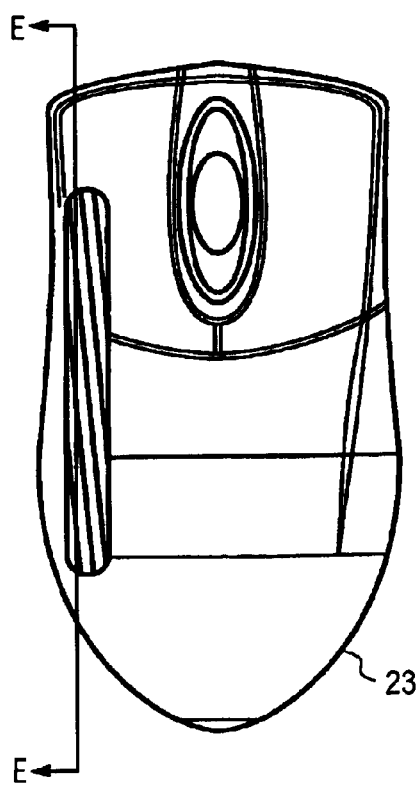
FIG. 19 is a top view of a second embodiment of the wireless mouse of FIG. 1.
Figure 20:
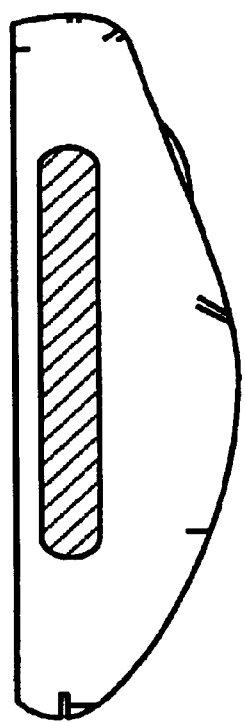
FIG. 20 is a cross-sectional view along the lines and in the direction of arrows E—E on FIG. 19.
Figure 21:
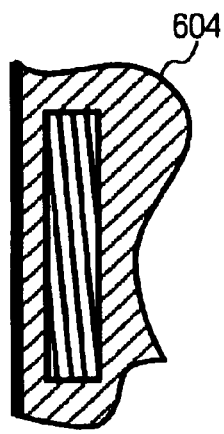
FIG. 21 is a cross-sectional view along the lines and in the direction of arrows B—B on FIG. 2.

FIGS. 19 to 21 are a variation of FIGS. 7 to 10 in that primary coil 604 is immediately adjacent wall 602—in this case a side wall of keyboard 14. The secondary coil 608 is adjacent a side 630 of mouse 23.

Figure 14:
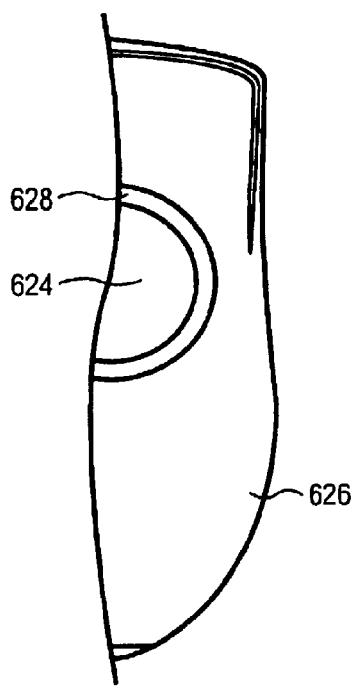
FIG. 14 is a partial underneath view of the embodiment of FIG. 13.
Figure 15:
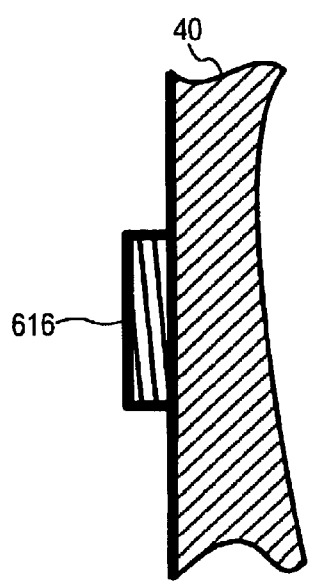
FIG. 15 is one embodiment of a partial cross-sectional view along the lines and in the direction of arrows A—A on FIG. 2.
Figure 22:
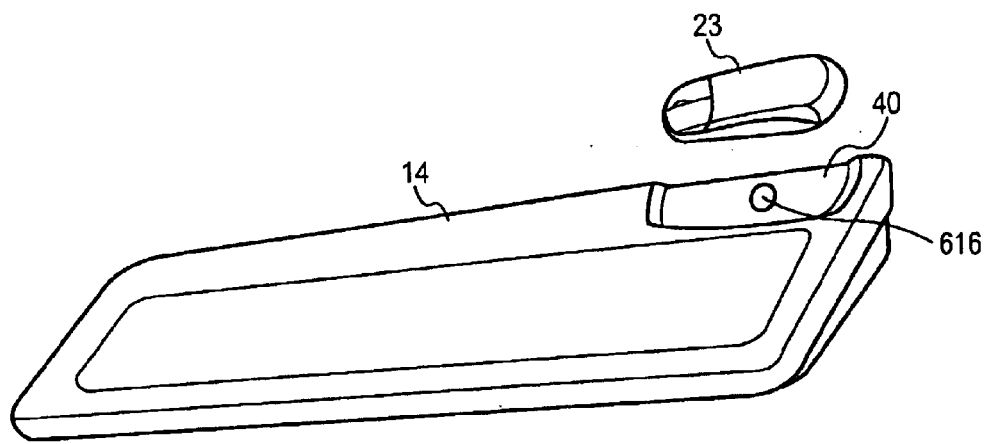
FIG. 22 is a partial perspective view illustrating the mouse of FIGS. 12 to 14 with the keyboard of FIG. 2.
Figure 23:
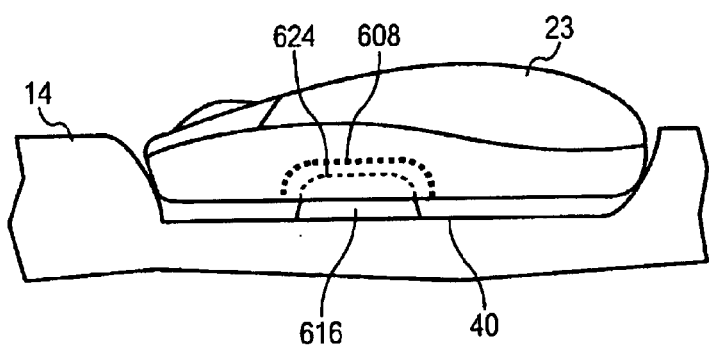
FIG. 23 is a partial side view of the mouse and keyboard of FIG. 22 prior to engagement of the mouse with the keyboard.
Figure 24:
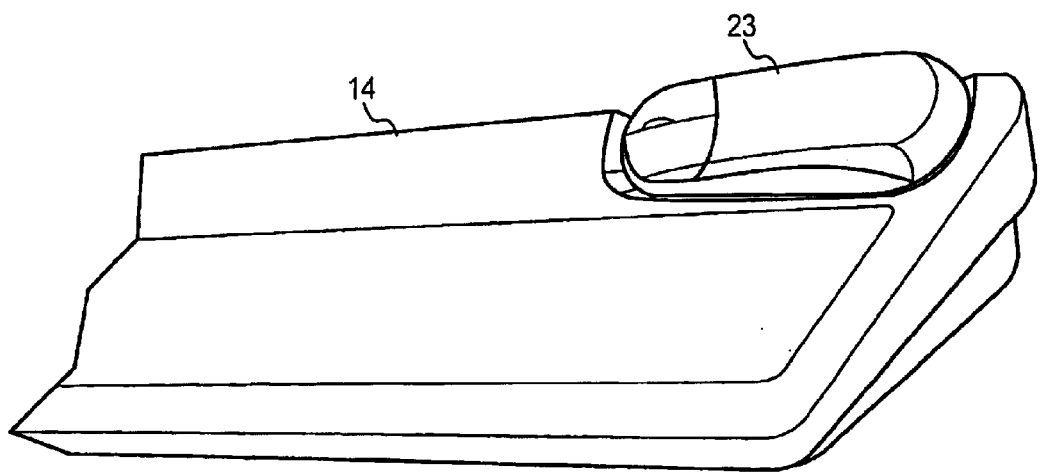
FIG. 24 is a partial perspective view corresponding to FIG. 22 after engagement of the mouse on the keyboard.

FIGS. 22 to 24 show the mouse 23 of FIGS. 12 to 14 with the docking station 40 of keyboard 14 where the rod 616 engages in recess 624.

Figure 25:
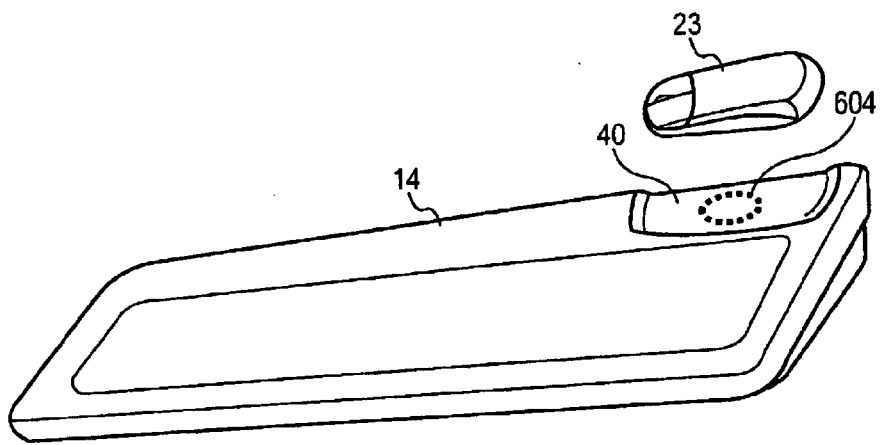
FIG. 25 is a partial perspective view illustrating the mouse of FIGS. 16 and 17 with the keyboard of FIG. 2.
Figure 26:
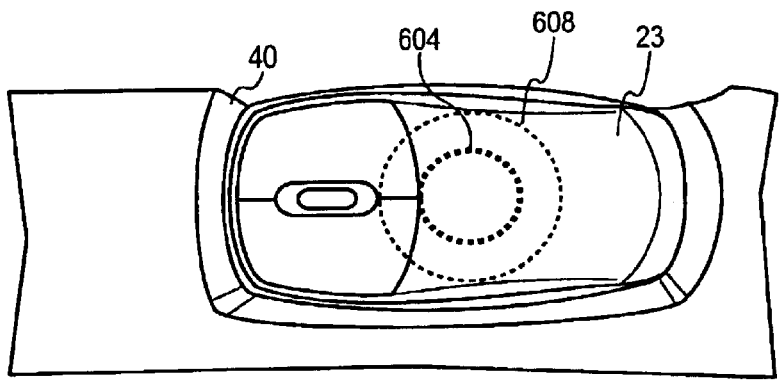
FIG. 26 is a partial top view of the mouse and keyboard of FIG. 25 after engagement of the mouse with the keyboard
Figure 27:
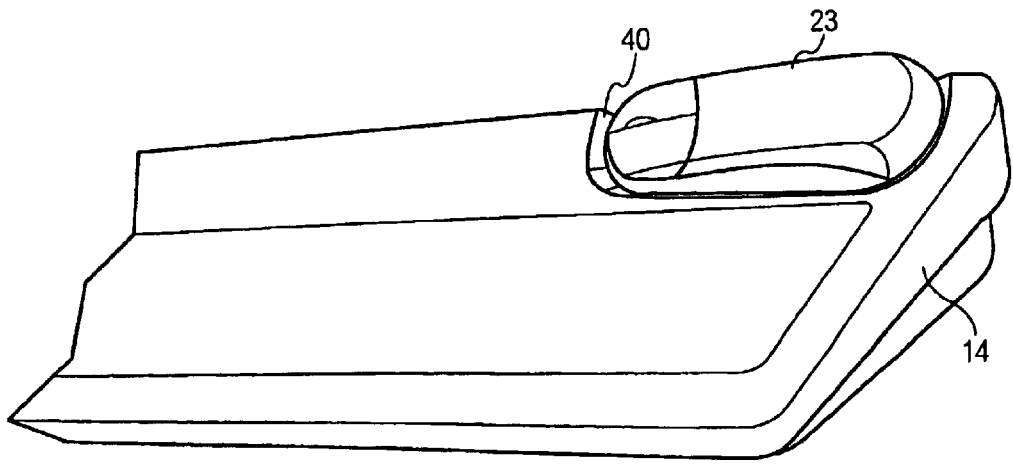
FIG. 27 is a partial perspective view corresponding to FIG. 25 after engagement of the mouse on the keyboard.

FIGS. 25 to 27 show mouse 23 of FIGS. 16 and 17 with the keyboard of FIG. 2. Here the docking station 40 is recessed into keyboard 14. Coils 604 and 608 operate as previously.

Figure 28:
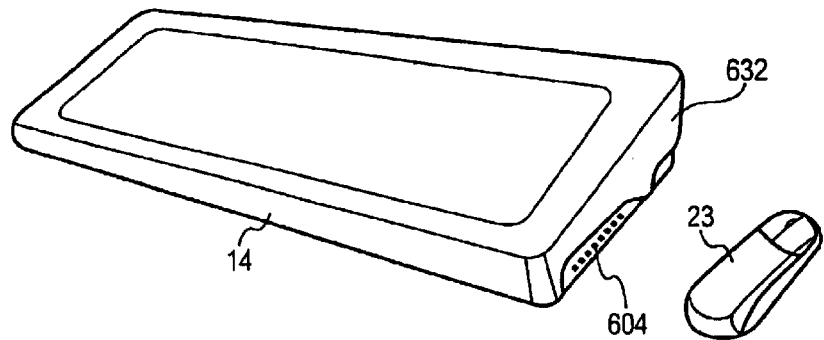
FIG. 28 is a partial perspective view illustrating the mouse of FIGS. 19 and 20 with the keyboard of FIG. 2.
Figure 29:
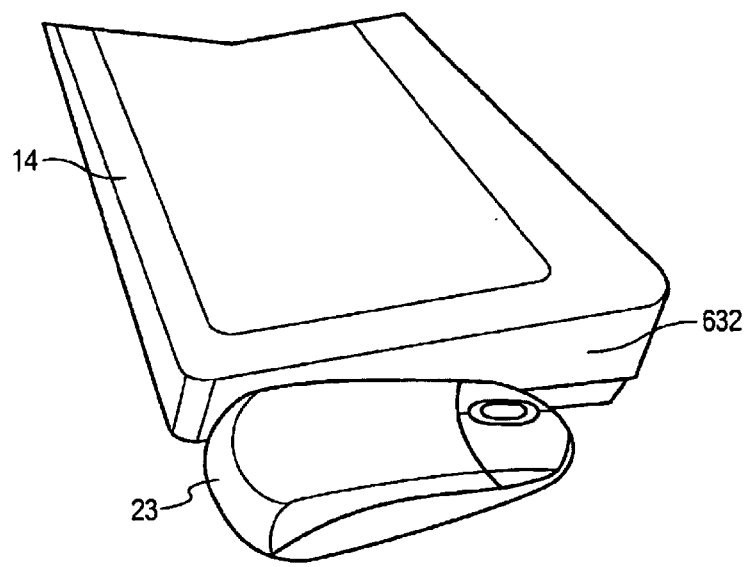
FIG. 29 is a partial side view of the mouse of FIG. 28 prior to engagement of the mouse with the keyboard.
Figure 30:
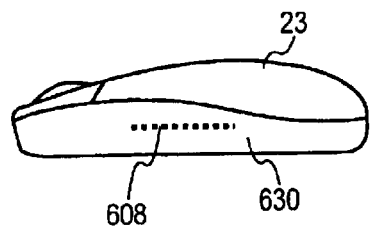
FIG. 30 is a partial perspective view corresponding to FIG. 28 after engagement of the mouse with the keyboard.

FIGS. 28 to 30 show the mouse 23 of FIGS. 19 and 20 with the keyboard 14 of FIG. 2. Here the primary coil 604 is in the side 632 of keyboard 14, and the secondary coil 608 is in the side 630 of mouse 23. Bringing the two coils in close relationship enables recharging to take place. Preferably, the close relationship is offset so that an end of the secondary coil 608 is adjacent an end of the primary coil 604 with there being no overlap of primary coil 604 and secondary coil 608.

Figure 31:
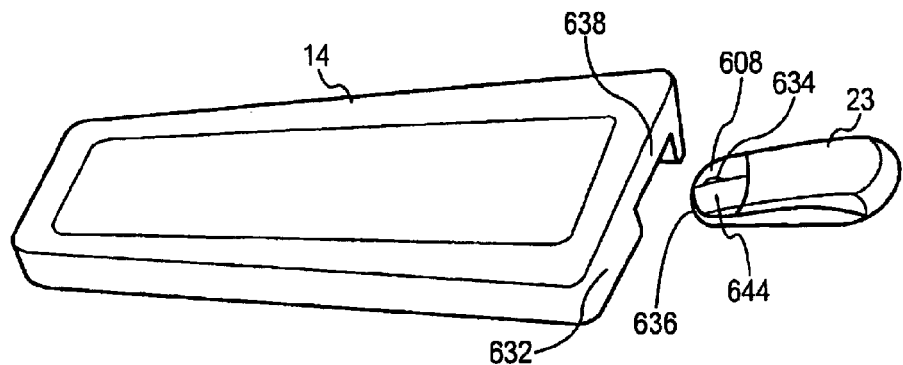
FIG. 31 is a partial perspective view illustrating an alternative form of mouse with a variant of the keyboard of FIG. 2.
Figure 32:
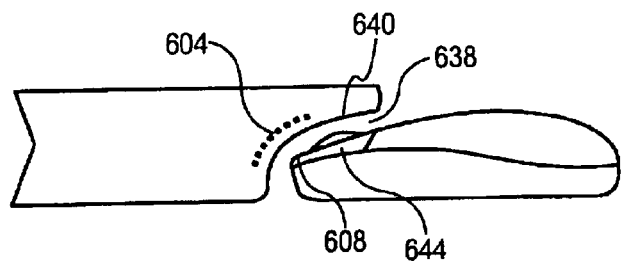
FIG. 32 is a partial side view of the mouse and keyboard of FIG. 31 after engagement of the mouse with the keyboard.
Figure 33:
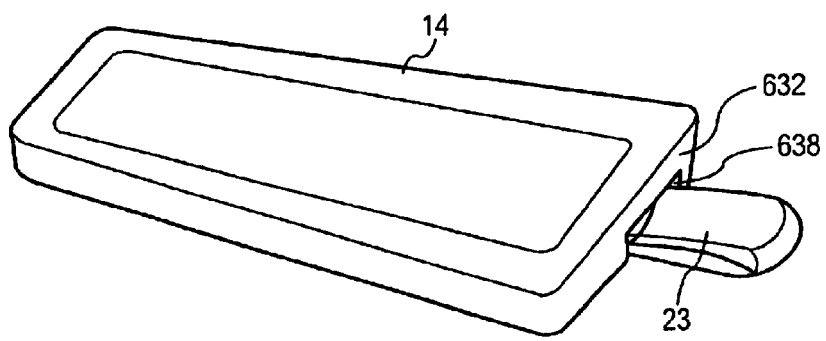
FIG. 33 is a partial perspective view corresponding to FIG. 31 after engagement of the mouse with the keyboard.
Figure 34:
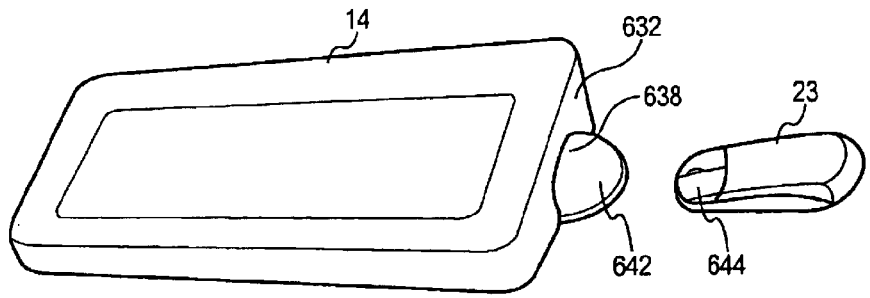
FIG. 34 is a partial perspective view illustrating a further alternative form of mouse with a further variant of the keyboard of FIG. 2.
Figure 35:
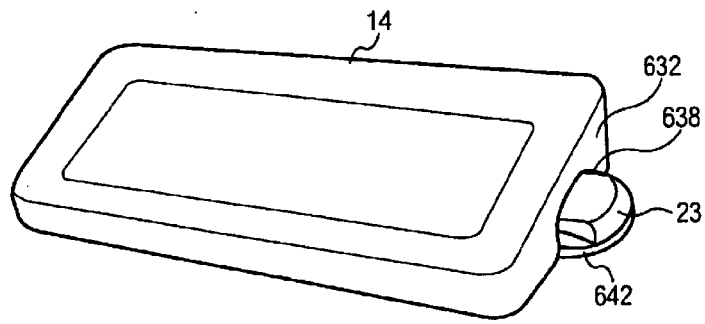
FIG. 35 is a partial perspective view of the mouse of FIG. 34 after engagement of the mouse with the keyboard.
Figure 36:
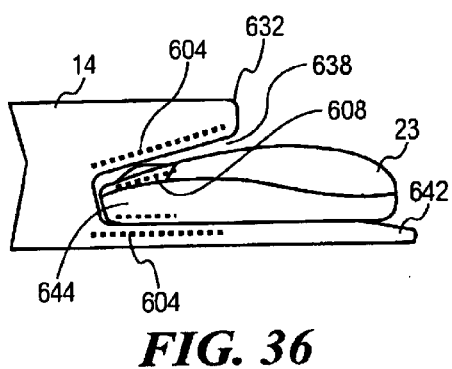
FIG. 36 is a partial side cross-sectional view corresponding to FIG. 34 after engagement of the mouse with the keyboard.
Figure 37:
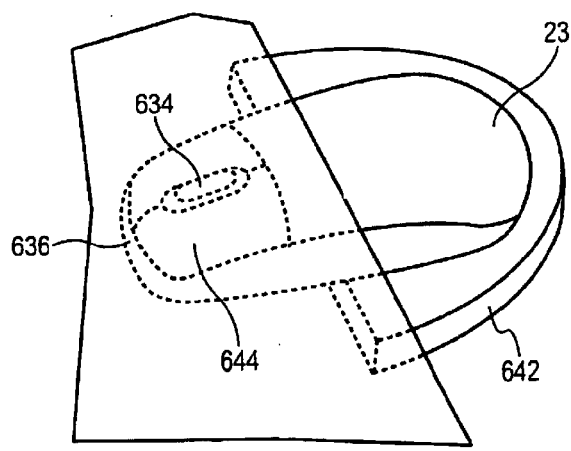
FIG. 37 is a partial perspective view in cutaway of the mouse of FIG. 34 after engagement with the keyboard.

FIGS. 31 to 33 show an alternative form of mouse 23 with a variant of the keyboard 14 of FIG. 2. Here the secondary coil 608 is between the scroll wheel 634 and the front 636 of mouse 23. The primary coil 604 is in the front/top surface 640 of a recess 638 in the side 632 of keyboard 14 and that is sized and shaped to receive the front portion 644 of mouse 23. When the front portion of mouse 23 is fully inserted into recess 638, the secondary coil 608 is brought into adjacent relationship with the primary coil 604 to enable recharging to take place. FIGS. 34 to 37 show the mouse 23 of FIGS. 31 to 33 with a variation of the keyboard 14 of FIGS. 31 to 33. The only differences are that recess 638 is elevated up wall 632 to allow the addition of a small shelf 642 on which the mouse 23 can rest when its batteries are being recharged, or for transport. This also enables primary coil 604 to be wound around recess 638, and thus for an enlarged secondary coil 608 to be in the front portion 644 of mouse 23.

In all other respects, the apparatus and operation to recharge the batteries 612 of mouse 23 is the same.

Whilst there has been described in the foregoing description preferred embodiments of the present invention, it will be understood by those skilled in the technology that many variations or modifications in details of design, construction or operation may be made without departing from the present invention.

What is claimed is:

1. An alphanumeric keyboard, comprising:
   (a) a plurality of walls;
   (b) a digital data connector for connection with a host computer;
   (c) a built-in wireless data receiver for receiving wireless communication from a peripheral device, the wireless data receiver being able to communicate with the host computer using the digital data connector and being able to have power supplied to it from the host computer using the digital data connector;
   (d) one of the plurality of walls comprising a docking station for a wireless mouse;
   (e) the docking station comprising a primary coil of a contactless induction recharger, the primary coil being able to have power supplied to it by the digital data connector; and
   (f) the peripheral device comprising a wireless mouse comprising a secondary coil of the recharger, the recharger being for the recharging of at least one rechargeable battery in the wireless mouse.

2. An alphanumeric keyboard as claimed in claim 1, wherein the digital data connector is selected from the group consisting of: USB and IEEE 1394.

3. An alphanumeric keyboard as claimed in claim 1, wherein the at least one in-built functional component is selected from the group consisting of: a card reader, a wireless data receiver, and an audio circuit.

4. An alphanumeric keyboard as claimed in claim 3, wherein the card reader is for non-volatile memory devices to be used in conjunction with the host computer for at least one of: data transfer, data storage, multimedia file playback, multimedia data transfer, and multimedia data storage.

5. An alphanumeric keyboard as claimed in claim 4, wherein the non-volatile memory devices are selected from the group consisting of: Flash memory cards, Secure Digital memory cards, Multi-Media Cards, Compact Flash cards, Memory Sticks, Memory Sticks Pro, Microdrives, and SmartMedia memory cards.

6. An alphanumeric keyboard as claimed in claim 5, wherein the card reader comprises a radio frequency card reader.

7. An alphanumeric keyboard as claimed in claim 1, further comprising:
   (a) at least one in-built functional component for co-operating with at least one external component to enable data received from the at least one external component to be communicated to the host computer using the digital data connector;
   (b) the in-built functional component being able to have power supplied to it from the host computer using the digital data connector, the external component being external to both the host and the alphanumeric keyboard.

8. An alphanumeric keyboard having a plurality of alphanumeric keys and including at least one built-in microphone able to be operated in an automatic mode; whereby upon at least one of the plurality of alphanumeric keys being activated, the at least one microphone is muted for a predetermined period, the predetermined period being controlled by a timer.

9. An alphanumeric keyboard as claimed in claim 8, wherein there are a plurality of microphones in a spaced-apart relationship in the alphanumeric keyboard.

10. An alphanumeric keyboard as claimed in claim 8, wherein there is provided a keyboard driver for generating a scan code resulting from the activation of the at least one of the alphanumeric keys, the scan code being able to be detected by the processor to enable the processor to mute an audio line from the at least one microphone and, at the end of the predetermined period, the processor enables the at least one microphone by cancelling the muting of the audio line.

11. An alphanumeric keyboard as claimed in claim 10, wherein upon the processor detecting a further scan code resulting from a further activation of at least one of the alphanumeric keys within the predetermined period, the timer resets the predetermined period.

12. An alphanumeric keyboard as claimed in claim 8, wherein the at least one built-in microphone detects the activation of the at least one of the alphanumeric keys and mutes an audio component and, at the end of the predetermined period, the at least one microphone is enabled by cancelling the muting.

13. An alphanumeric keyboard as claimed in claim 12, wherein the audio component is selected from the group consisting of: an audio line, a digital amplifier, an analog audio component, and a digital audio component.

14. An alphanumeric keyboard as claimed in claim 12, wherein the alphanumeric keyboard has a buffer to delay processing of signals to prevent key press sounds from being processed as desired audio inputs.

15. An alphanumeric keyboard as claimed in claim 14, wherein upon a key press sound being detected, the buffer is purged and muting takes place.

16. An alphanumeric keyboard as claimed in claim 12, wherein upon the at least one microphone detecting a further activation of at least one of the alphanumeric keys within the predetermined period, the timer resets the predetermined period.

17. An alphanumeric keyboard as claimed in claim 8, wherein the predetermined period is in the range 10 milliseconds to 10 seconds.

18. An alphanumeric keyboard as claimed in claim 8, further including echo cancellation.

19. An alphanumeric keyboard as claimed in claim 8, further including a switch to control the operation of the at least one microphone.

20. An alphanumeric keyboard as claimed in claim 19, wherein the switch is a physical switch and has an LED display to indicate an operational mode of the switch.

21. An alphanumeric keyboard as claimed in claim 8, further including a digital data connector for connection with a host computer, the alphanumeric keyboard having at least one in-built functional component for co-operating with at least one external component to enable data received from the at least one external component to be communicated to the host computer using the digital data connector; the at least one in-built functional component being able to have power supplied to it from the host computer using the digital data connector.

22. An alphanumeric keyboard as claimed in claim 21, wherein the at least one in-built functional component is selected from the group consisting of: a card reader, a wireless data receiver, and a primary coil of a recharger.

23. An alphanumeric keyboard having a digital data connector for supplying received DC power to the keyboard, the keyboard comprising an inverter for converting the received DC power to a primary AC power of a primary frequency; a primary coil immediately adjacent a wall of the keyboard and being adapted to have applied to it the primary AC power; the primary coil being able to induce an eddy current in a secondary coil located within a wireless mouse when the secondary coil is brought into close proximity to the primary coil so as to generate a secondary voltage across the secondary coil to enable recharging of at least one battery in the wireless mouse by contactless induction charging.

24. An alphanumeric keyboard as claimed in claim 23, wherein the primary coil has a hollow core.

25. An alphanumeric keyboard as claimed in claim 24, wherein the primary coil has a ferrite rod in the hollow core.

26. An alphanumeric keyboard as claimed in claim 25, wherein the primary coil is perpendicular to the wall, the ferrite rod projecting through the wall for surface interlock charging.

27. An alphanumeric keyboard as claimed in claim 23, wherein the secondary coil has a hollow core.

28. An alphanumeric keyboard as claimed in claim 23, wherein the primary coil is parallel to the wall for surface close coupled charging with the secondary coil having an end of the secondary coil adjacent an end of the primary coil with there being no overlap of primary coil and secondary coil.

29. An alphanumeric keyboard as claimed in claim 23, wherein the primary frequency is above the audible range.

30. An alphanumeric keyboard as claimed in claim 29 wherein the primary frequency is in the range of from 20 KHz to 25 KHz.

31. An alphanumeric keyboard as claimed in claim 23, wherein the secondary voltage in converted to DC to enable the recharging.

32. An alphanumeric keyboard as claimed in claim 23, wherein the alphanumeric keyboard has a recess in a side wall thereof sized and shaped to receive a front portion of the mouse; the recess having a wall, the primary coil being adjacent the wall, and the secondary coil being in the front portion of the mouse.

33. An alphanumeric keyboard as claimed in claim 32, wherein the recess has a shelf on which the mouse can rest.

34. An alphanumeric keyboard as claimed in claim 23, wherein the wall of the alphanumeric keyboard is a side wall, the mouse having a mouse wall, the mouse wall being able to contact the side wall; the secondary coil being adjacent the mouse wall.

35. An alphanumeric keyboard as claimed in claim 23, wherein the wall is a top surface of the alphanumeric keyboard, there being provided a docking station in the top surface; the primary coil being located under the docking station; the secondary coil being located above a base of the mouse.

36. An alphanumeric keyboard having a digital data connector for connection with a host computer, the alphanumeric keyboard comprising at least one in-built functional component for co-operating with at least one external component to enable data received from the at least one external component to be communicated to the host computer using the digital data connector; and the in-built functional component is able to have power supplied to it from the host computer using the digital data connector, the external component being external to both the host and the alphanumeric keyboard; the alphanumeric keyboard also having a plurality of alphanumeric keys and including at least one built-in microphone able to be operated in an automatic mode; whereby upon at least one of the plurality of alphanumeric keys being activated, the at least one microphone is muted for a predetermined period, the predetermined period being controlled by a timer.

37. An alphanumeric keyboard having a digital data connector for connection with a host computer, the alphanumeric keyboard comprising at least one in-built functional component for co-operating with at least one external component to enable data received from the at least one external component to be communicated to the host computer using the digital data connector; and the in-built functional component is able to have power supplied to it from the host computer using the digital data connector, the external component being external to both the host and the alphanumeric keyboard; the alphanumeric keyboard also comprising an inverter for converting the supplied power to a primary AC power of a primary frequency; a primary coil immediately adjacent a wall of the keyboard and being adapted to have applied to it the primary AC power; the primary coil being able to induce an eddy current in a secondary coil located within a wireless mouse when the secondary coil is brought into close proximity to the primary coil so as to generate a secondary voltage across the secondary coil to enable recharging of at least one battery in the wireless mouse by contactless induction charging.

38. An alphanumeric keyboard having a digital data connector for connection with a host computer, the alphanumeric keyboard comprising at least one in-built functional component for co-operating with at least one external component to enable data received from the at least one external component to be communicated to the host computer using the digital data connector; and the in-built functional component is able to have power supplied to it from the host computer using the digital data connector, the external component being external to both the host and the alphanumeric keyboard; the alphanumeric keyboard also comprising a plurality of alphanumeric keys and including at least one built-in microphone able to be operated in an automatic mode; whereby upon at least one of the plurality of alphanumeric keys being activated, the at least one microphone is muted for a predetermined period, the predetermined period being controlled by a timer; the alphanumeric keyboard further comprising an inverter for converting the supplied power to a primary AC power of a primary frequency; a primary coil immediately adjacent a wall of the keyboard and being adapted to have applied to it the primary AC power; the primary coil being able to induce an eddy current in a secondary coil located within a wireless mouse when the secondary coil is brought into close proximity to the primary coil so as to generate a secondary voltage across the secondary coil to enable recharging of at least one battery in the wireless mouse by contactless induction charging.

* * * * *